US008956039B2

(12) United States Patent
Lin

(10) Patent No.: US 8,956,039 B2
(45) Date of Patent: Feb. 17, 2015

(54) SAFETY PROTECTION DEVICE FOR A SPEED CHANGING DEVICE OF A MIXER

(76) Inventor: Wen-Chih Lin, Taichung (TW)

( * ) Notice: Subject to any disclaimer, the term of this patent is extended or adjusted under 35 U.S.C. 154(b) by 415 days.

(21) Appl. No.: 13/598,778

(22) Filed: Aug. 30, 2012

(65) Prior Publication Data

US 2014/0064018 A1 Mar. 6, 2014

(51) Int. Cl.
*A21C 1/02* (2006.01)

(52) U.S. Cl.
USPC ........................................ 366/206; 366/601

(58) Field of Classification Search
CPC ................ B01F 15/00389; B01F 2015/00629
USPC ................................................ 366/206, 601
See application file for complete search history.

(56) References Cited

U.S. PATENT DOCUMENTS

| | | | | |
|---|---|---|---|---|
| 7,273,315 B2 * | 9/2007 | Huang et al. | .................. | 366/206 |
| 2004/0120215 A1 * | 6/2004 | Huang et al. | .................. | 366/203 |
| 2009/0091199 A1 * | 4/2009 | Lee | .................. | 310/50 |
| 2012/0014207 A1 * | 1/2012 | Lee et al. | .................. | 366/100 |
| 2012/0228968 A1 * | 9/2012 | Lee et al. | .................. | 310/50 |

* cited by examiner

*Primary Examiner* — Charles Cooley
*Assistant Examiner* — Marc C Howell
(74) *Attorney, Agent, or Firm* — Patent Office of Bang Shia

(57) ABSTRACT

A safety protection device for a speed changing device of a mixer is provided with a control unit on an operating rod assembly, and a tact switch is used in combination with the control unit. When using the operating rod assembly to perform gear shift, the user can feel whether the gear has been shifted to the correct position based on position change of the control unit with respect to the tact switch. During gear shift, the tact switch will turn off the power to the motor controller to stop the motor, so that gear shift operation can be performed more smoothly without interference with the motion transmission parts of the mixer, and consequently, the life of the mixer can be extended.

9 Claims, 9 Drawing Sheets

SAFETY PROTECTION DEVICE FOR A SPEED CHANGING DEVICE OF A MIXER

BACKGROUND OF THE INVENTION

1. Field of the Invention

The present invention relates to a speed changing device of a mixer, and more particularly to a safety protection device for a speed changing device of a mixer.

2. Description of the Prior Art

A conventional mixer is normally provided with an operating rod assembly for allowing the user to perform gear shift. The operating rod assembly is interconnected to a gear shift fork inside the mixer. Operating the operating rod assembly can drive the gear shift fork to engage with different gears so as to change rotation speed of the drive shaft, and consequently changing the rotation speed of the mixer. When the operating rod assembly is being operated during gear shift, the motion transmission parts of the mixer are still moving or rotating. Therefore, the gear shifting operation will interfere with the respective motion transmission parts, causing jamming and collision of the motion transmission parts. In addition, the gear shift operation cannot be performed smoothly due to the interference with the motion transmission parts.

The present invention has arisen to mitigate and/or obviate the afore-described disadvantages.

SUMMARY OF THE INVENTION

The primary object of the present invention is to provide a safety protection device for a speed changing device of a mixer, which is capable of preventing jamming and collision of the motion transmission parts of the mixer, and ensuring that the gear shift operation can be smoothly performed.

To achieve the above object, a safety protection device for a speed changing device of a mixer in accordance with the present invention is disposed in a control panel of the mixer and interconnected to a gear shift fork. The safety protection device comprises: an operating rod, a control unit, a device panel, a tact switch, a motor controller, a plurality of elastic pressing assemblies and an eccentric drive shaft.

The operating rod assembly includes an operating section, a driven section, and a drive section.

The control unit is formed on the operating rod assembly.

The device panel is fixed on the mixer and includes a display surface and a back surface, in the device panel is formed a through hole, and the driven section of the operating assembly is pivoted in the through hole of the device panel.

The tact switch is connected to one end of a trigger arm, and another end of the trigger arm is provided with a trigger roller, the tact switch is fixed on the display surface of the device panel, and the trigger roller of the tact switch is aligned with the control unit.

The motor controller is electrically connected to the tact switch, when the trigger roller is disengaged from the tact switch, power of the motor controller will be turned off.

The eccentric drive shaft includes a connecting section and an eccentric driven section eccentrically formed on the connecting section. The connecting section is formed with an axial hole for insertion of the drive section of the operating rod assembly, and the eccentric driven section of the eccentric drive shaft is interconnected to and driving the gear shift fork to perform gear shift.

DETAILED DESCRIPTION OF THE PREFERRED EMBODIMENTS

Figure 1:
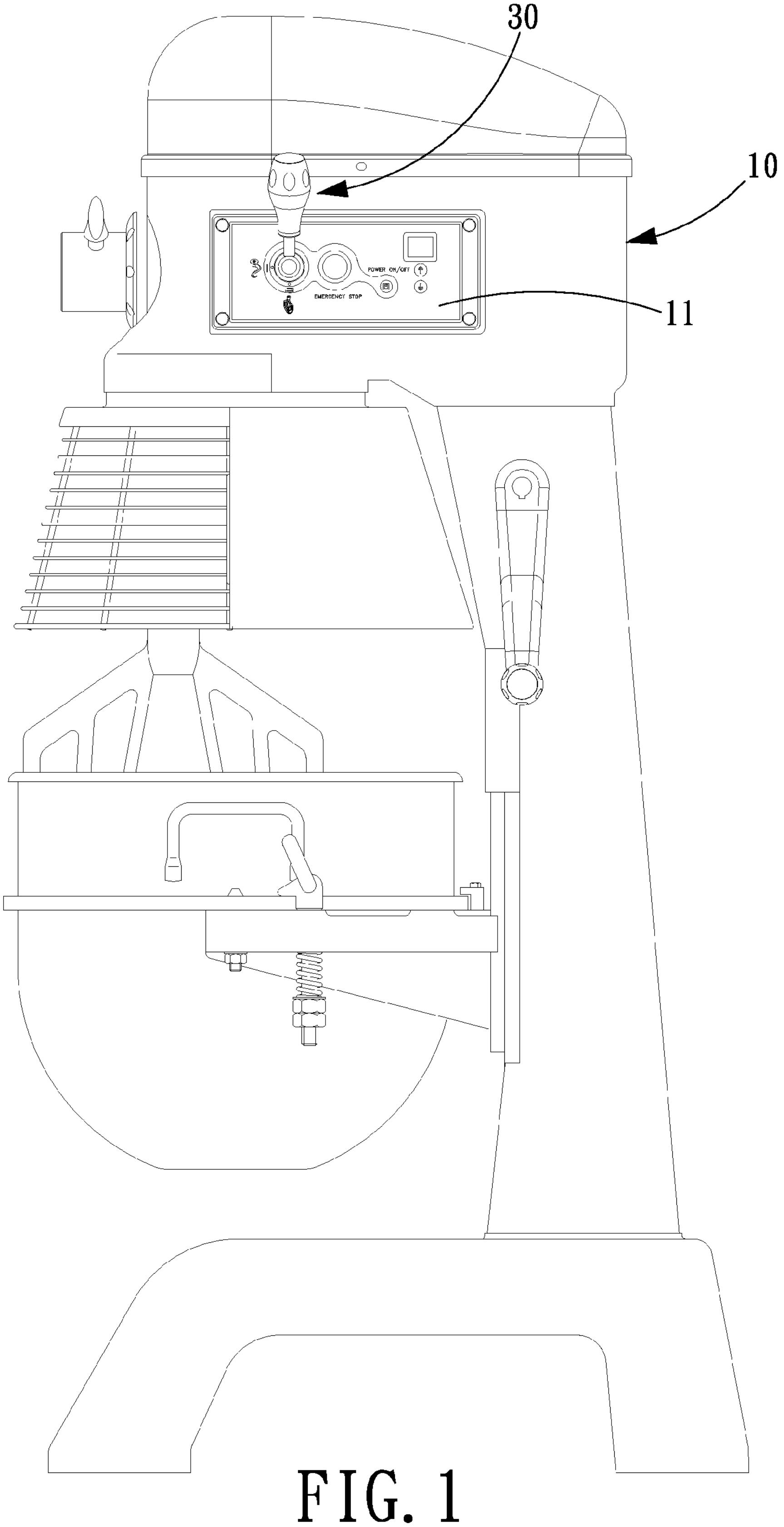
FIG. 1 is an illustrative view of a mixer with a safety protection device for a speed changing device in accordance with the present invention.
Figure 2:
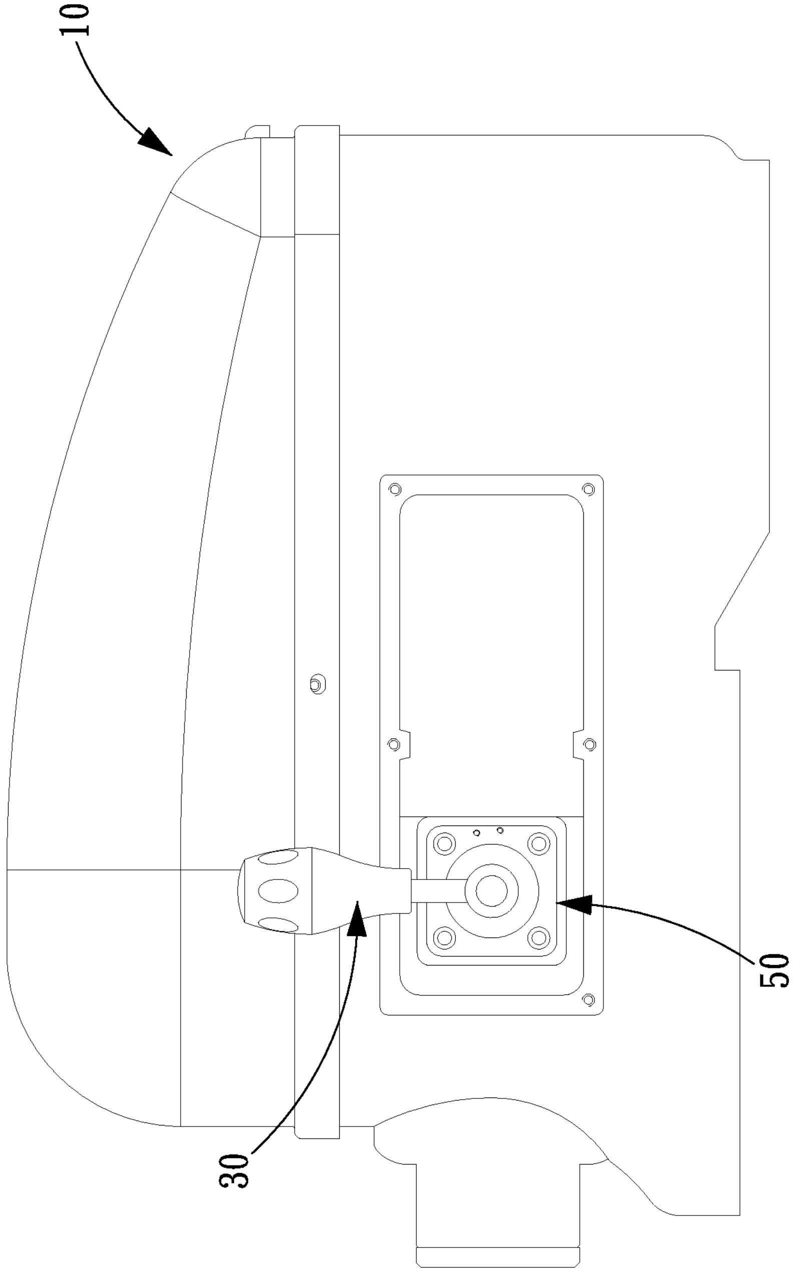
FIG. 2 is an illustrative view showing the safety protection device for a speed changing device is mounted on a mixer in accordance with the present invention, wherein the control panel of the mixer has been removed.
Figure 3:
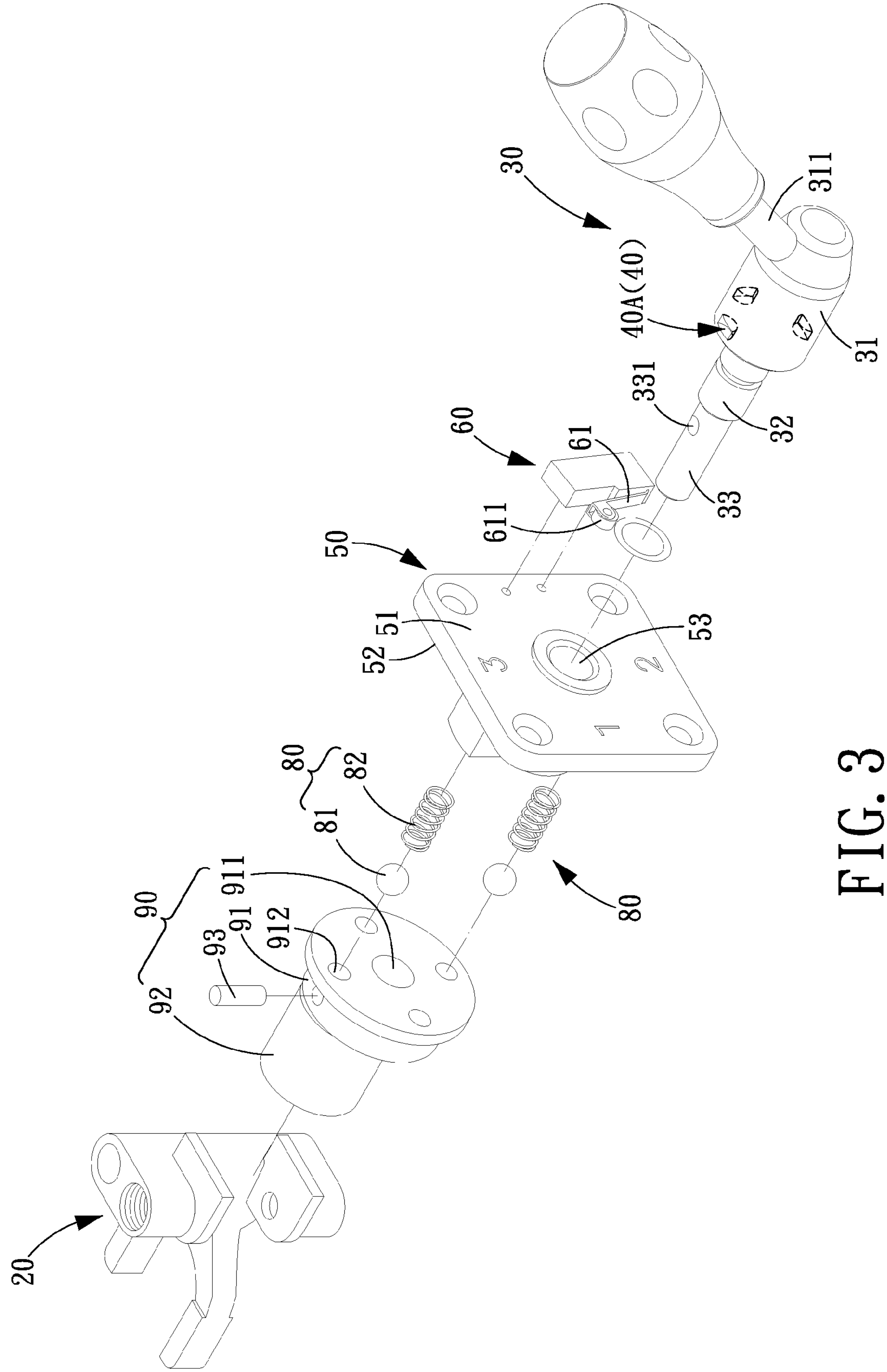
FIG. 3 is an exploded view of a safety protection device for a speed changing device of a mixer in accordance with a first preferred embodiment of the present invention.
Figure 4:
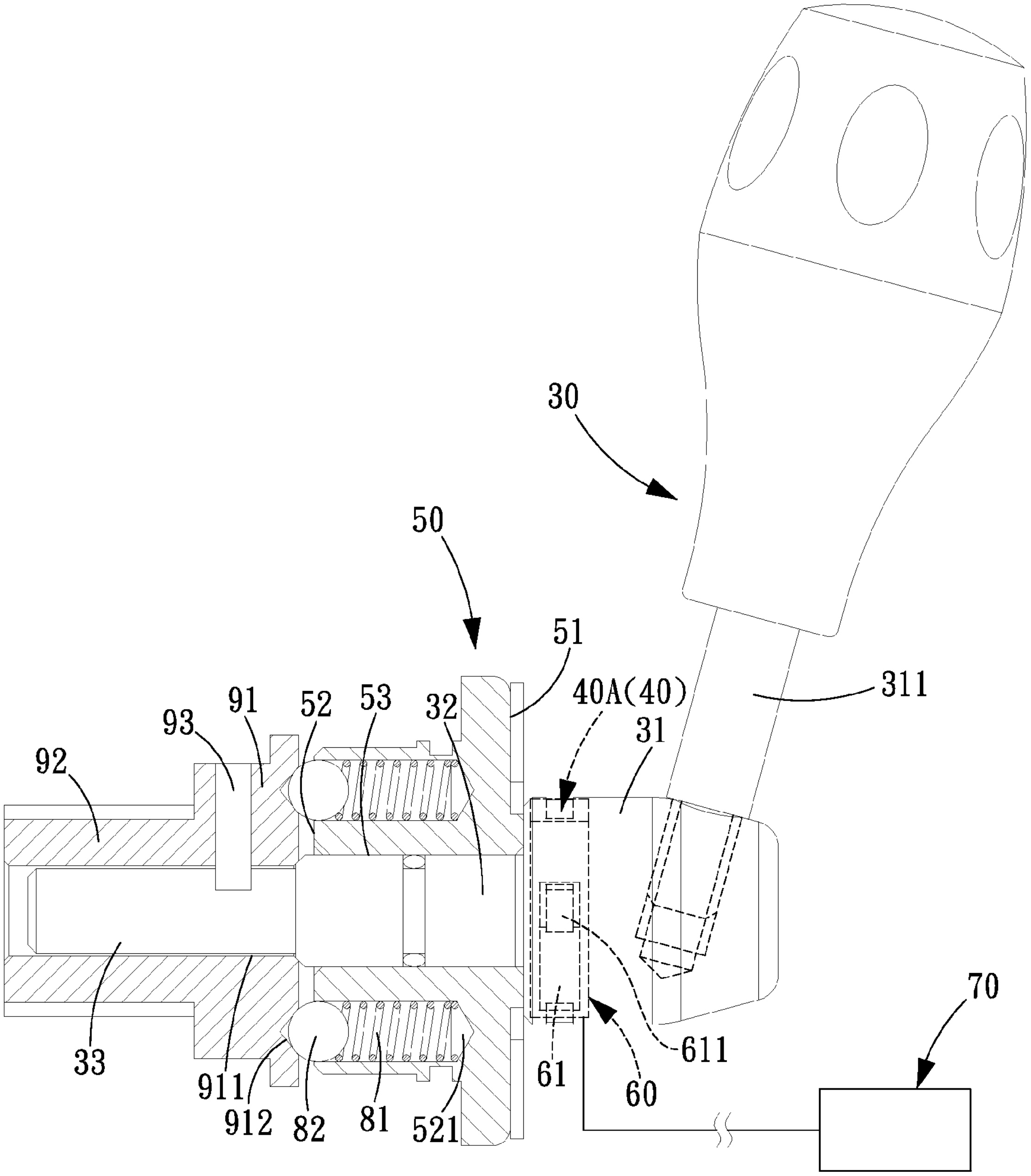
FIG. 4 is a cross sectional view of the safety protection device for a speed changing device of a mixer in accordance with the first preferred embodiment of the present invention.

The present invention will be clearer from the following description when viewed together with the accompanying drawings, which show, for purpose of illustrations only, the preferred embodiment in accordance with the present invention.

Referring to FIGS. 1-8, a safety protection device for a speed changing device of a mixer 10 in accordance with a first preferred embodiment of the present invention is disposed in a control panel 11 of the mixer 10 and interconnected to a gear shift fork 20. The safety protection device comprises: an operating rod assembly 30, a control unit 40, a device panel 50, a tact switch 60, a motor controller 70, a plurality of elastic pressing assemblies 80 and an eccentric drive shaft 90.

The operating rod assembly 30 includes an operating section 31, a driven section 32, and a drive section 33 coaxial with the driven section 32. On the operating section 31 is provided an operating rod 311, and on the drive section 33 is defined a positioning groove 331.

The control unit 40 includes a plurality of arc-shaped grooves 40A formed in the operating section 31 of the operating rod assembly 30.

The device panel 50 is fixed on the mixer 10 and includes a display surface 51 and a back surface 52. In the device panel 50 is formed a through hole 53, and on the back surface 52 of the device panel 50 are formed two receiving cavities 54. The driven section 32 of the operating rod assembly 30 is pivoted in the through hole 53 of the device panel 50.

The tact switch 60 is connected to one end of a trigger arm 61, and another end of the trigger arm 61 is provided with a trigger roller 611. The tact switch 60 is fixed on the display surface 51 of the device panel 50, and the trigger roller 611 of the tact switch 60 is aligned to the control unit 40.

The motor controller 70 is electrically connected to the tact switch 60, and the tact switch 60 controls power on and off of the motor controller 70.

The elastic pressing assemblies 80 each include a spring 81 received in the receiving cavities 54 of the device panel 50, and a ball 82 pressed against by the spring 81.

The eccentric drive shaft 90 includes a connecting section 91 and an eccentric driven section 92 eccentrically formed on the connecting section 91. In this embodiment, the connecting section 91 is formed with an axial hole 911 and a plurality of positioning cavities 912 around the axial hole 911. The drive section 33 of the operating rod assembly 30 is inserted in the axial hole 911 of the eccentric drive shaft 90 and fixed therein by a pin 93 inserted through the connecting section 91 and into the positioning groove 331 of the drive section 33 in such a manner that the positioning cavities 912 are aligned to the elastic pressing assemblies 80, and the balls 82 of the elastic pressing assemblies 80 are pressed against the positioning cavities 912 of the eccentric drive shaft 90. The eccentric driven section 92 of the eccentric drive shaft 90 is interconnected to and drives the gear shift fork 20 to perform gear shift.

Figure 5A:
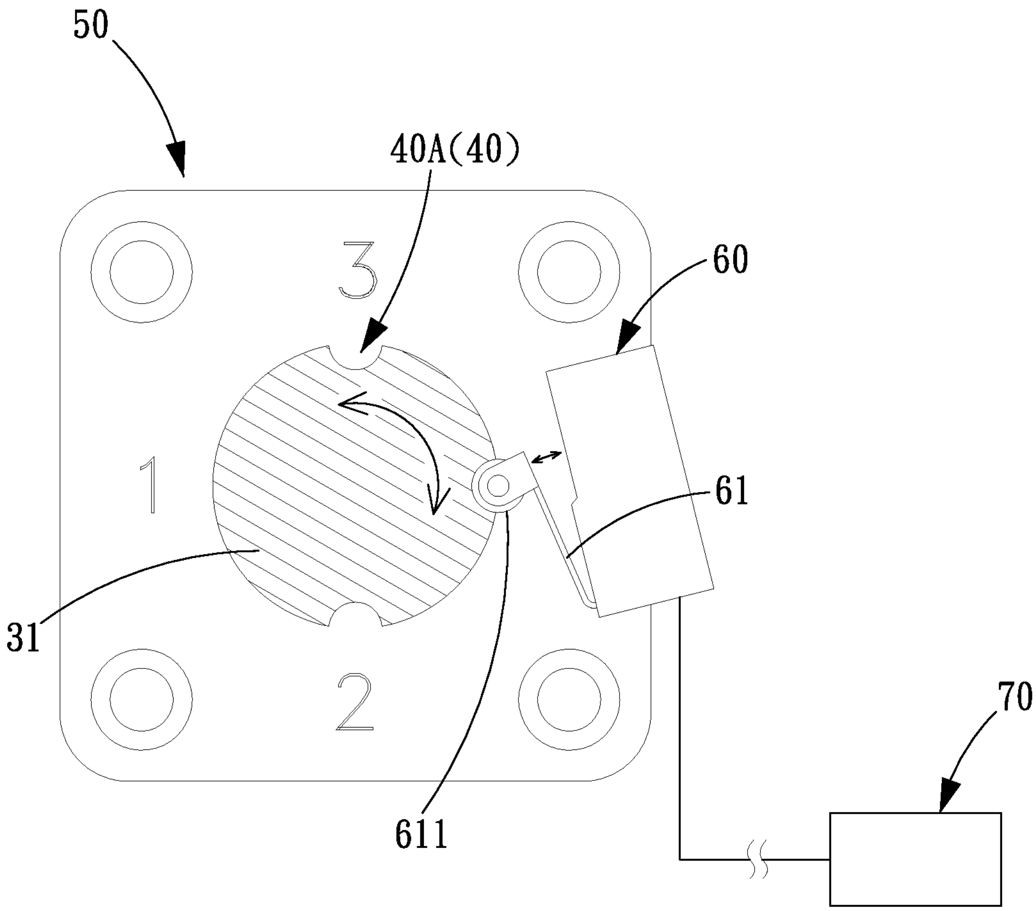
FIG. 5A is a cross sectional view of a part of the safety protection device for a speed changing device of a mixer in accordance with the first preferred embodiment of the present invention.

When the mixer 10 is powered on and rotates at a predetermined speed, the trigger arm 61 is not pressed, and the trigger roller 611 is engaged in the control unit 40. At this moment, the trigger arm 61 is located in the initial position, and the power to the mixer 10 is on, as shown in FIG. 5A.

Figure 5B:
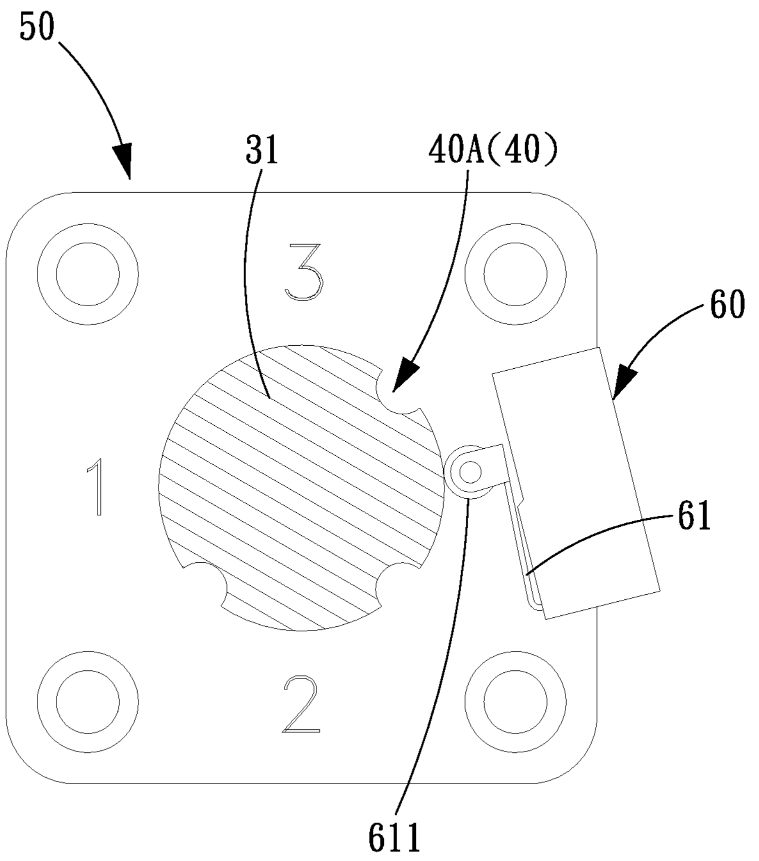
FIG. 5B shows another state of the cross sectional view of the safety protection device for a speed changing device of a mixer as shown in FIG. 5A.

Gear shift can be performed by pulling or pushing the operating rod 311. When the operating rod 311 is pushed by a user, the operating rod assembly 30 will rotate, consequently, the trigger roller 611 will be disengaged from the control unit 40 and pressed against the operating section 31 of the operating rod assembly 30, so that the operating section 31 will press against the trigger arm 61 to make it rotate, as shown in FIG. 5B. When the trigger arm 61 is pressed and rotates, it will produce signal to control power on and off of the motor controller 70. At this moment, the user can keep pushing or pulling the operating rod assembly 30 to rotate the eccentric drive shaft 90, which consequently drives the gear shift fork 20 to perform gear shift.

It is clear from the above description that, when the mixer 10 is powered on and rotates at a predetermined speed, the tact switch 60 is aligned with (engaged in) the control unit 40. During gear shift operation, once the tact switch 60 is caused to disengage from the control unit 40, power will be off instantly to reduce jamming and collision of the motion transmission parts of the mixer while extending life of the mixer 10.

When the operating rod assembly 30 is pushed or pulled by the user to perform gear shift, the gear position will be displayed on the display surface 51 of the device panel 50. Meanwhile, the elastic pressing assemblies 80 will be pressed by the pulling or pushing force applied by the user to make the eccentric drive shaft 90 rotate. When the operating rod assembly 30 pivots to the correct gear position, the elastic pressing assemblies 80 will be engaged in the positioning cavities 912 of the eccentric drive shaft 90 again, the user can easily feel whether the gear has been shifted to the correct position, thus improving ease of use and accuracy of gear shift.

Figure 6:
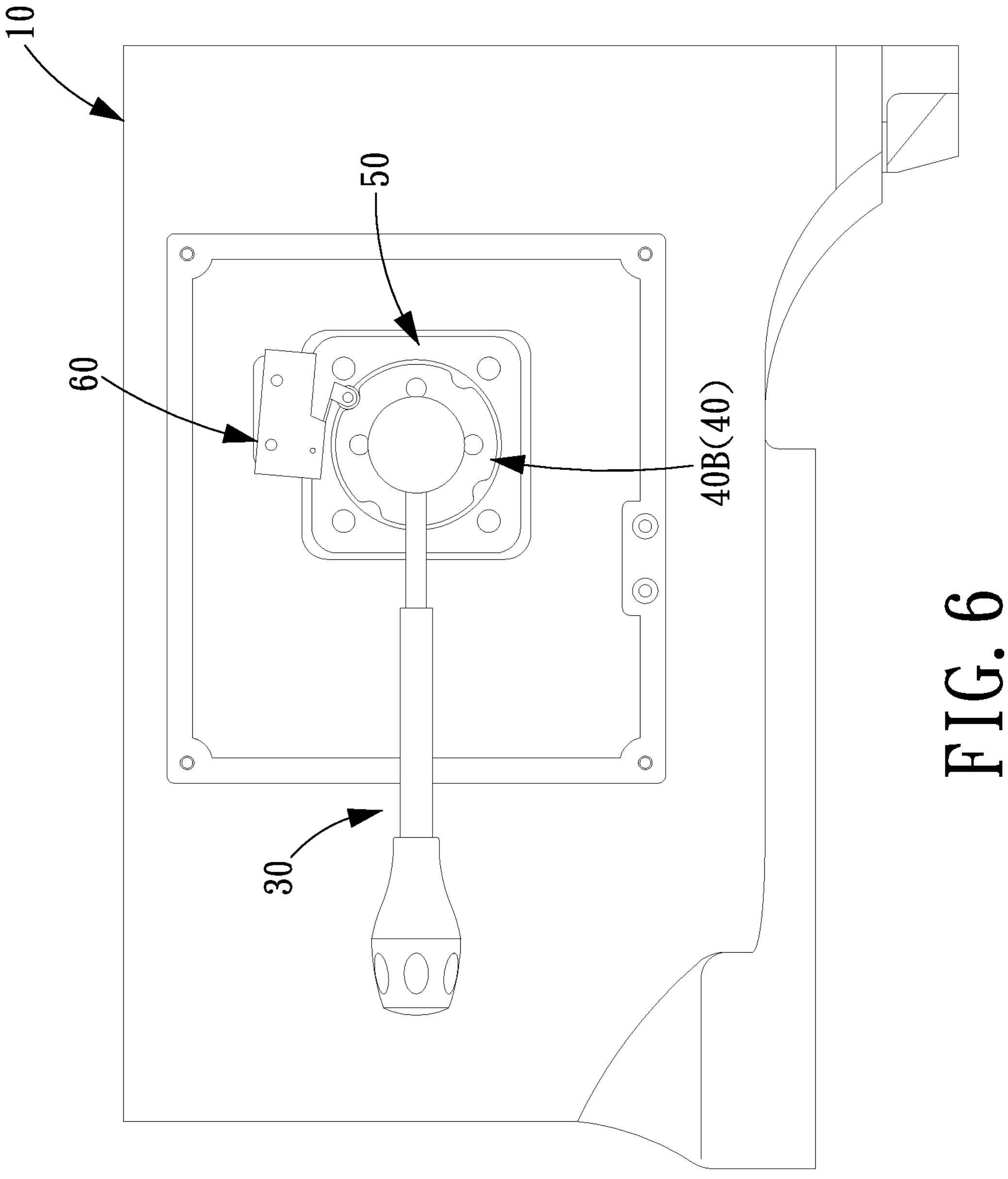
FIG. 6 is an illustrative view showing the safety protection device for a speed changing device in accordance with a second embodiment of the present invention is mounted on a mixer.
Figure 7:
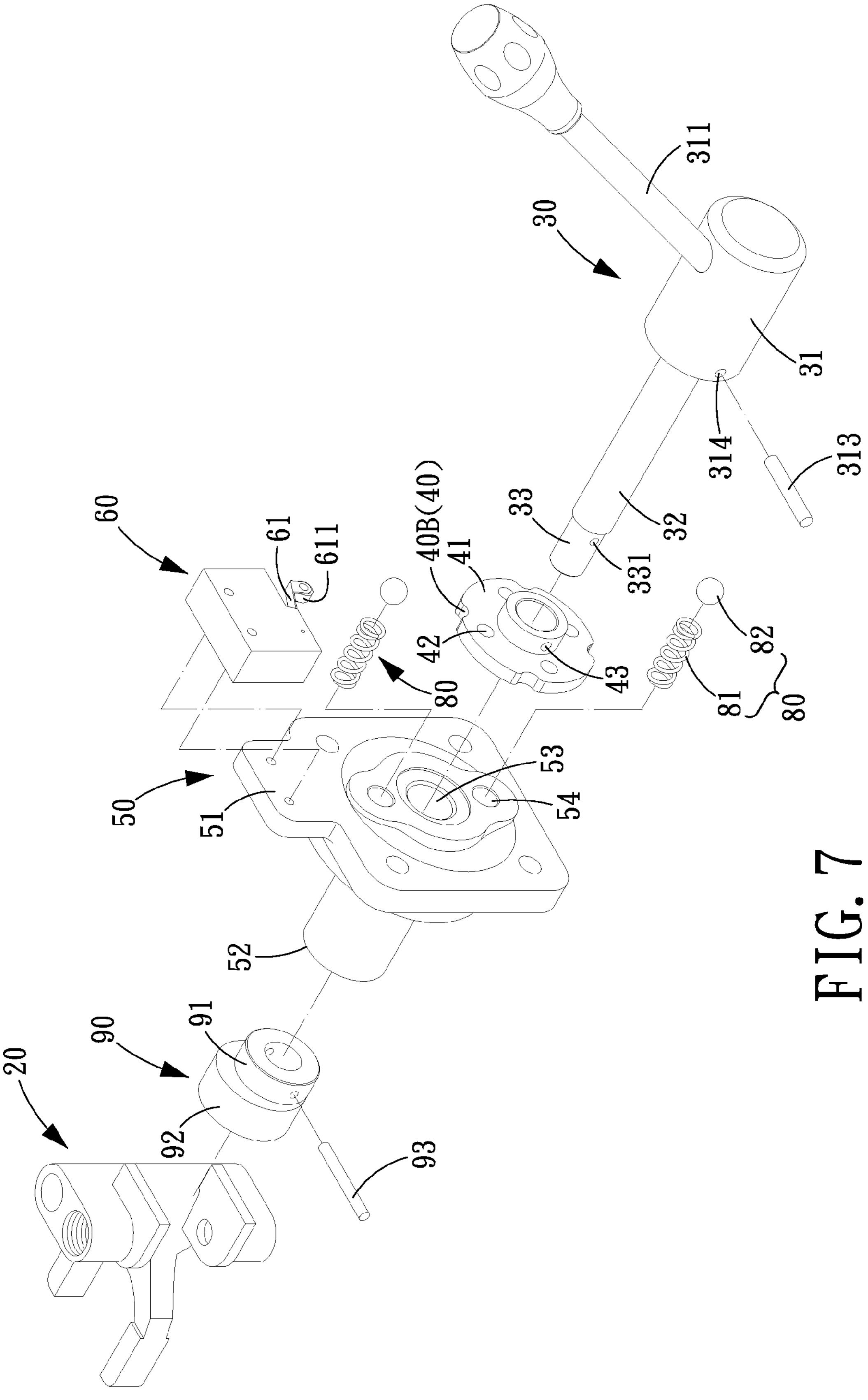
FIG. 7 is an exploded view of a safety protection device for a speed changing device of a mixer in accordance with the second preferred embodiment of the present invention.
Figure 8:
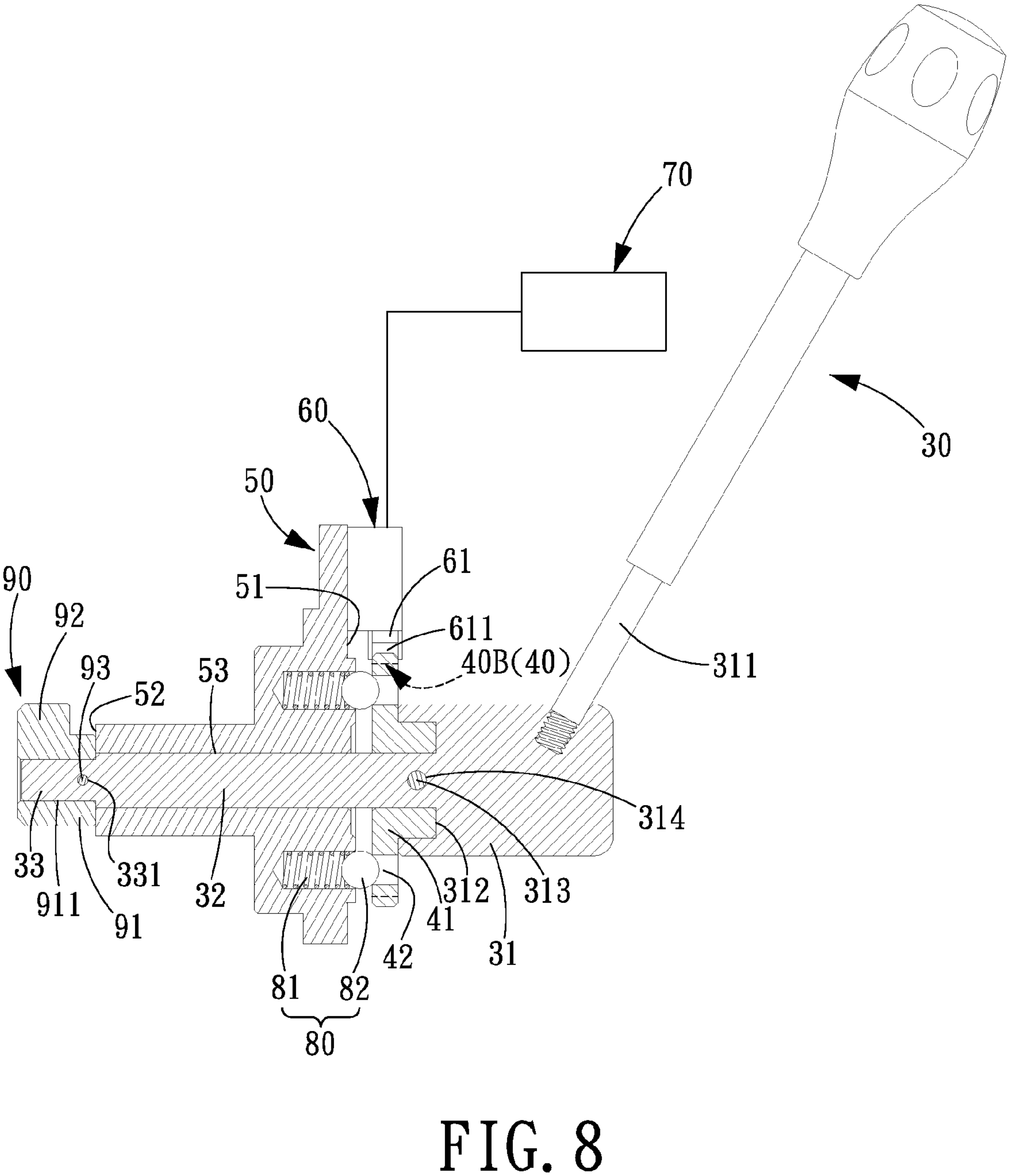
FIG. 8 is a cross sectional view of the safety protection device for a speed changing device of a mixer in accordance with the second preferred embodiment of the present invention.

Referring to FIGS. 6-8, a safety protection device for a speed changing device of a mixer 10 in accordance with a second embodiment of the present invention is similar to the first embodiment, except that: the receiving cavities 54 for receiving the springs 81 are formed in the display surface 51 of the device panel 50. The control unit 40 includes a plurality of arch-shaped grooves 40B formed on a sleeve 41. On the sleeve 41 is formed a plurality of apertures 42 which are aligned with the receiving cavities 54 of the device panel 50 and have a diameter slightly smaller than the diameter of the balls 82. At an end surface of the operating section 31 of the operating rod assembly 30 connecting to the driven section 32 is formed an engaging groove 312. The sleeve 41 is fixed in the engaging groove 312 by inserting a pin 313 through an inserting hole 43 of the sleeve 41 and into a pin hole 314 formed in the operating section 31. When the sleeve 41 is sleeved onto the operating rod assembly 30, and the operating rod assembly 30 is inserted in the device panel 50, the elastic pressing assemblies 80 will be located between the sleeve 41 and the device panel 50 in such a manner the springs 81 will be received in the receiving cavities 54, and the balls 82 are disposed between the springs 81 and the apertures 42.

Similar as the operation of the first embodiment, when the operating rod assembly 30 is operated (pulled or pushed), the force applied to the operating rod assembly 30 will press the elastic pressing assemblies 80 to enable the operating rod assembly 30 to be operated more smoothly and reliably. Furthermore, during gear shift operation, the tact switch 60 can cooperate with the control unit 40 to enable the user to feel the gear position change.

While we have shown and described various embodiments in accordance with the present invention, it is clear to those skilled in the art that further embodiments may be made without departing from the scope of the present invention.

What is claimed is:

1. A safety protection device for a speed changing device of a mixer being disposed in the mixer and interconnected to a gear shift fork, the safety protection device comprising:

an operating rod assembly with an operating section, a driven section, and a drive section;

a control unit formed on the operating rod assembly;

a device panel fixed on the mixer and including an display surface and a back surface, in the device panel being formed a through hole, and the driven section of the operating assembly being pivoted in the through hole of the device panel;

a tact switch connected to one end of a trigger arm, and another end of the trigger arm being provided with a trigger roller, the tact switch being fixed on the display surface of the device panel, and the trigger roller of the tact switch being aligned with the control unit;

a motor controller electrically connected to the tact switch, when the trigger roller is disengaged from the tact switch, power of the motor controller will be turned off; and an eccentric drive shaft including a connecting section and an eccentric driven section eccentrically formed on the connecting section, the connecting section being formed with an axial hole for insertion of the drive section of the operating rod assembly, and the eccentric driven section of the eccentric drive shaft being interconnected to and driving the gear shift fork to perform gear shift.

2. The safety protection device for a speed changing device of the mixer as claimed in claim 1, wherein the control unit includes a plurality of arc-shaped grooves formed in the operating section of the operating rod assembly.

3. The safety protection device for a speed changing device of the mixer as claimed in claim 1, wherein the tact switch is disposed on the display surface of the device panel.

4. The safety protection device for a speed changing device of the mixer as claimed in claim 1, wherein the drive section is formed with a positioning groove, and the drive section is fixed to the eccentric drive shaft by a pin inserted through the connecting section and into the positioning groove of the drive section.

5. The safety protection device for a speed changing device of the mixer as claimed in claim 1, wherein the control unit is fixed by a sleeve to an end surface of the operating section of the operating rod assembly connecting to the driven section, and the control unit includes a plurality of arc-shaped grooves formed on the sleeve.

6. The safety protection device for a speed changing device of the mixer as claimed in claim 5, wherein an engaging groove is formed at the end surface of the operating section of the operating rod assembly connecting to the driven section is formed an engaging groove, and the sleeve is fixed in the engaging groove by inserting a pin through an inserting hole of the sleeve and into a pin hole of the operating section.

7. The safety protection device for a speed changing device of the mixer as claimed in claim 1, wherein an operating rod is provided on the operating section.

8. The safety protection device for a speed changing device of the mixer as claimed in claim 1, wherein two receiving cavities are formed on the back surface of the device panel, a plurality of positioning cavities is formed around the axial hole, a plurality of elastic pressing assemblies are located between the device panel and the eccentric drive shaft, each of the elastic pressing assemblies includes a spring received in the receiving cavities of the device panel, and a ball pressed between the spring and the positioning cavities.

9. The safety protection device for a speed changing device of the mixer as claimed in claim 5, wherein the operating rod assembly is disposed on a display surface of the device panel, a plurality of receiving cavities is formed in the display surface, on the sleeve is formed a plurality of apertures aligned with the receiving cavities, a plurality of elastic pressing assemblies is disposed between the device panel and the sleeve, and each of the elastic pressing assemblies includes a spring received in the receiving cavities, and a ball pressed between the spring and the apertures.

* * * * *